United States Patent
Miyazaki

(12) 
(10) Patent No.: US 6,265,826 B1
(45) Date of Patent: Jul. 24, 2001

(54) PLASMA ADDRESSING DISPLAY DEVICE

(75) Inventor: Shigeki Miyazaki, Gifu (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/387,844

(22) Filed: Sep. 1, 1999

(30) Foreign Application Priority Data

Sep. 11, 1998 (JP) .................................................. 10-257351

(51) Int. Cl.⁷ .................................................. G02F 1/1333
(52) U.S. Cl. ........................... 313/586; 313/584; 313/587
(58) Field of Search ..................................... 313/586, 584, 313/585, 587; 345/41, 60

(56) References Cited

U.S. PATENT DOCUMENTS

| | | | |
|---|---|---|---|
| 5,627,431 | * | 5/1997 | Hayashi .............................. 345/60 X |
| 5,684,361 | * | 11/1997 | Seki .................................. 313/583 X |
| 5,834,896 | * | 11/1998 | Hayashi et al. .................... 313/586 X |

FOREIGN PATENT DOCUMENTS 4-265931    9/1992  (JP) .

* cited by examiner

*Primary Examiner*—Ashok Patel
(74) *Attorney, Agent, or Firm*—Sonnenschein, Nath & Rosenthal

(57) ABSTRACT

A plasma addressing display device has a flat panel structure in which a display cell and a plasma cell are stacked to each other. The plasma cell has discharge electrodes formed on a lower substrate in such a manner as to extend along the discharge channels, and barrier ribs formed in such a manner as to partition adjacent ones of the discharge channels from each other. The feature of the present invention lies in the discharge electrodes. The discharge electrode is composed of a pair of longitudinal electrode portions disposed on both sides of the barrier rib, and a plurality of crossarm electrode portions disposed on the underside of the barrier rib in such a manner as to connect the longitudinal electrode portions to each other. The discharge electrode has a ladder structure as a whole. Such an electrode structure is effective to increase the adhesive strength of the barrier ribs against the lower substrate, to reduce the resistance of the discharge electrodes, and to prevent occurrence of disconnection of the discharge electrodes.

5 Claims, 4 Drawing Sheets

F I G. 2
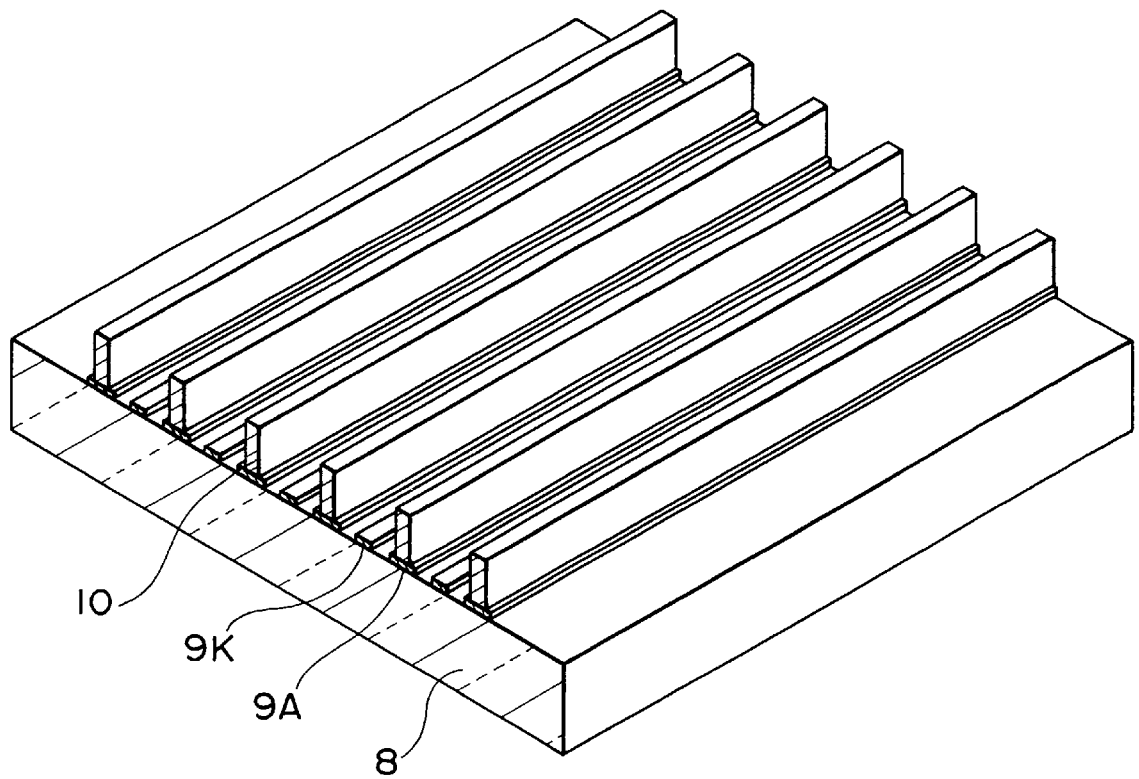

FIG. 4A  FIG. 4B
FIG. 4C  FIG. 4D
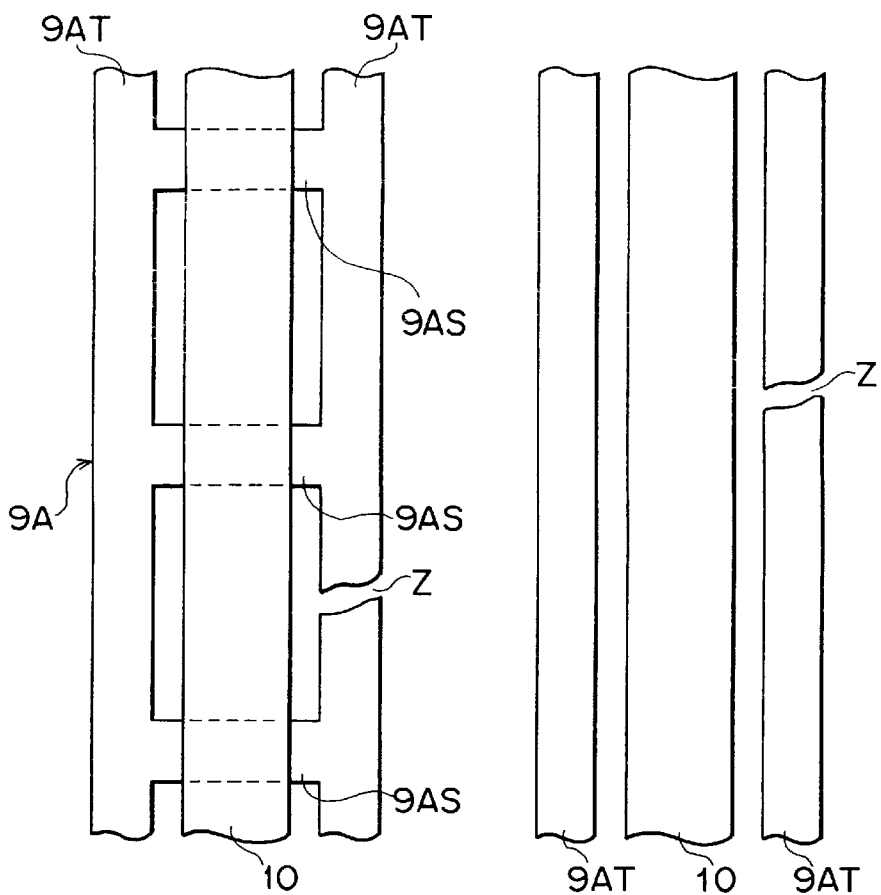
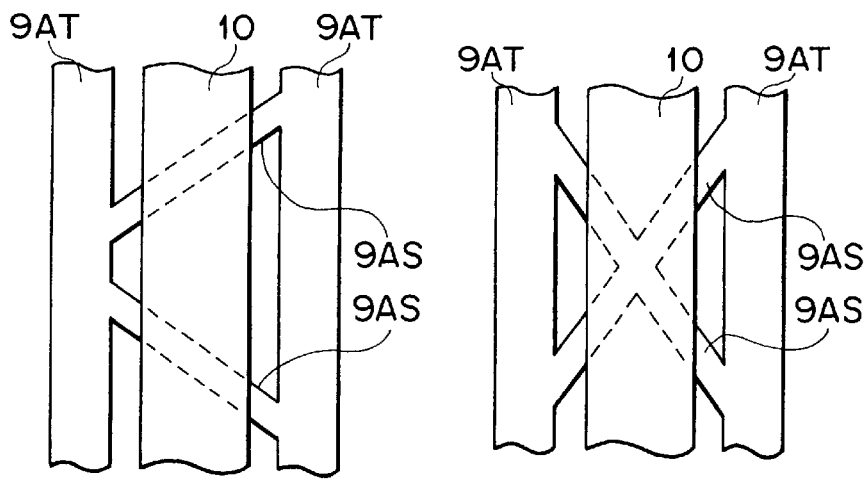

PLASMA ADDRESSING DISPLAY DEVICE

BACKGROUND OF THE INVENTION

The present invention relates to a plasma addressing display device having a flat panel structure in which a display cell and a plasma cell are stacked to each other, and particularly to an electrode structure in each of discharge channels formed in the plasma cell.

A plasma addressing display device configured to use a plasma cell for addressing a display cell has been disclosed, for example, in Japanese Patent Laid-open No. Hei 4-265931.

As shown in FIG. 1, the plasma addressing display device disclosed in the above document has a flat panel structure including a display cell 1, a plasma cell 2, and a common intermediate substrate 3 interposed therebetween.

The plasma cell 2 has a lower substrate 8 joined to the intermediate substrate 3 with a specific gap kept therebetween. An ionizable gas is enclosed in the gap therebetween.

Stripe-shaped discharge electrodes 9A and 9K are alternately formed on the inner surface of the lower substrate 8. The discharge electrode 9A having a wide width functions as an anode, and the discharge electrode 9K having a narrow width functions as a cathode. These discharge electrodes 9A and 9K are formed of a metal thin film.

Barrier ribs 10 are each formed on the anode side discharge electrode 9A, to thereby divide a space filled with the ionizable gas into discharge channels 12.

Each cathode side discharge electrode 9K is positioned between the adjacent ones of the barrier ribs 10.

The barrier ribs 10 can be formed by overlappingly coating the discharge electrodes 9A with typically glass paste by a screen printing process. The tops of the barrier ribs 10 are in contact with the underside of the intermediate substrate 3.

One discharge channel 12 includes one discharge electrode 9K functioning as the cathode and two discharge electrodes 9A functioning as the anodes disposed on both sides of the discharge electrode 9K. The discharge channel 12 generates a plasma discharge between the cathode side discharge electrode 9K and the anode side discharge electrodes 9A.

The intermediate substrate 3 is jointed to the lower substrate 8 by means of glass frit 11 or the like.

The display cell 1 has a transparent upper substrate 4. The upper substrate 4 is stuck on the intermediate substrate 3 with a specific gap kept therebetween by means of a sealing material 6 or the like, and the gap is filled with an electro-optic material such as a liquid crystal 7. Signal electrodes 5 are formed on the inner surface of the upper substrate 4. The signal electrodes 5 cross the stripe-shaped discharge channels 12 at right angles. Pixels are defined in a matrix pattern at portions where the signal electrodes 5 cross the discharge channels 12.

In the plasma addressing display device having the above-described configuration, the display drive is performed by scanning rows of the discharge channels 12 on the plasma cell 2 side in such a manner as to switch them in line-sequence and applying image signals to columns of the signal electrodes 5 on the display cell 1 side in synchronization with the scanning of the discharge channels 12. When a plasma discharge is generated in each discharge channel 12, the interior of the discharge channel 12 becomes a substantially uniformly anode potential, to effect the pixel selection for each row. That is to say, the discharge channel 12 functions as a sampling switch. When an image signal is applied to each pixel in the state in which the plasma sampling switch is made conductive, sampling for the pixel is performed, to thereby control the turn-on/off of the pixel. Even after the plasma sampling switch becomes non-conductive, the image signal remains held in the pixel.

FIG. 2 is a typical perspective view showing an electrode structure and a barrier rib structure on the lower substrate 8 shown in FIG. 1. The anode side discharge electrodes 9A and the cathode side discharge electrodes 9K, patterned into the stripe-shapes, are alternately arranged. These discharge electrodes are formed by depositing a metal thin film of aluminum or the like by sputtering or vacuum vapor-deposition and selectively etching the metal thin film into stripe shapes. The barrier ribs 10 are formed on the anode side discharge electrodes 9A. The width of the barrier rib 10 is typically 160 μm which is narrower than the width (typically, 470 μm) of the anode side discharge electrode 9A. The barrier ribs 10 can be formed by overlappingly coating the discharge electrodes 9A with dielectric paste such as glass paste and being baked. In addition, the width of the cathode side discharge electrode 9K is typically about 80 μm, and the lower substrate 8 is formed of typically a glass plate.

In the related art structure shown in FIG. 2, the barrier ribs 10 composed of the baked body of glass paste are formed on the broad discharge electrodes 9A formed of a metal thin film. However, the adhesion between a metal thin film and a baked body of glass paste is generally weak. Accordingly, the related art structure causes a problem that the barrier ribs 10 may be peeled or damaged during the manufacturing process. To solve the problem, it may be considered to change the material of the discharge electrodes 9A from the metal thin film of aluminum or the like into a baked body of conductive paste for improving the adhesion with the barrier ribs 10 made from the baked body of insulating paste such as glass paste; however, such a method has the following inconvenience. At present, only nickel paste containing nickel particles can be practically used as the conductive paste; however, if the discharge electrodes are made from the nickel paste, vapor of mercury must be previously contained in a discharge gas for preventing wear of nickel due to plasma discharge, giving rise to a problem in terms of both safety of products and environmental protection.

SUMMARY OF THE INVENTION

An object of the present invention is to provide a plasma addressing display device, which is capable of increasing an adhesive strength of barrier ribs against a substrate while using a metal thin film as a material of discharge electrodes.

To achieve the above object, according to the present invention, there is provided a plasma addressing display device which basically includes: a plasma cell including discharge channels sequentially arranged along the scanning direction; and a display cell joined to the plasma cell, the display cell including signal electrodes sequentially arranged in the direction perpendicular to the scanning direction and an electro-optic material layer being in contact with the signal electrodes; wherein the plasma cell has a substrate jointed to the display cell side with a specific gap kept therebetween; discharge electrodes formed on the substrate in such a manner as to extend along the discharge channels; and barrier ribs formed on the substrate in such a manner as to partition adjacent ones of the discharge channels from each other. The plasma addressing display device is characterized in that each of the discharge electrodes is composed of a pair of parallel longitudinal electrode portions disposed on both sides of one of the barrier ribs, and a plurality of crossarm electrode portions disposed on the underside of the barrier rib in such a manner as to connect the pair of longitudinal electrode portions to each other.

Preferably, the discharge electrodes are formed of a metal thin film, and the barrier ribs are formed of a baked body of a dielectric paste.

The discharge electrodes are preferably anode electrodes.

The plurality of crossarm electrode portions are preferably arranged in such a manner as to be spaced at specific intervals and to cross the pair of longitudinal electrode portions at right angles, so that the discharge electrode is formed into a ladder shape in a plan view as a whole.

The plurality of crossarm electrode portions may obliquely cross the pair of longitudinal electrode portions.

According to the present invention, the discharge electrode functioning as the anode is composed of a pair of parallel longitudinal electrode portions and a plurality of crossarm electrode portions for connecting the pair of the longitudinal electrode portions to each other, and the barrier rib is disposed between the pair of longitudinal electrode portions. Accordingly, most of the bottom of the barrier rib is in contact with the surface of the substrate made from typically glass. As a result, the adhesive strength of the barrier rib against the substrate is increased. On the other hand, the pair of parallel longitudinal electrode portions are connected to each other by the plurality of the crossarm electrode portions. That is to say, one discharge electrode is formed into a ladder shape as a whole. As a result, if there occurs a disconnection at part of the longitudinal electrode portion, the discharge electrode can keep the conductive path as a whole, thereby causing no operational problem. In addition, the crossarm electrode portions for connecting the pair of longitudinal electrode portions to each other has an effect of reducing the electric resistance of the discharge electrode.

BRIEF DESCRIPTION OF THE DRAWINGS

FIG. 2 is a perspective view showing discharge electrodes and barrier ribs formed on a lower substrate assembled in the related art plasma addressing display device;

FIGS. 4A to 4D are plan views each showing an arrangement relationship between a discharge electrode and a barrier rib formed in a plasma cell of the plasma addressing display device of the present invention.

DETAILED DESCRIPTION OF THE PREFERRED EMBODIMENTS

Hereinafter, embodiments of the present invention will be described in detail with reference to the drawings.

Figure 1:
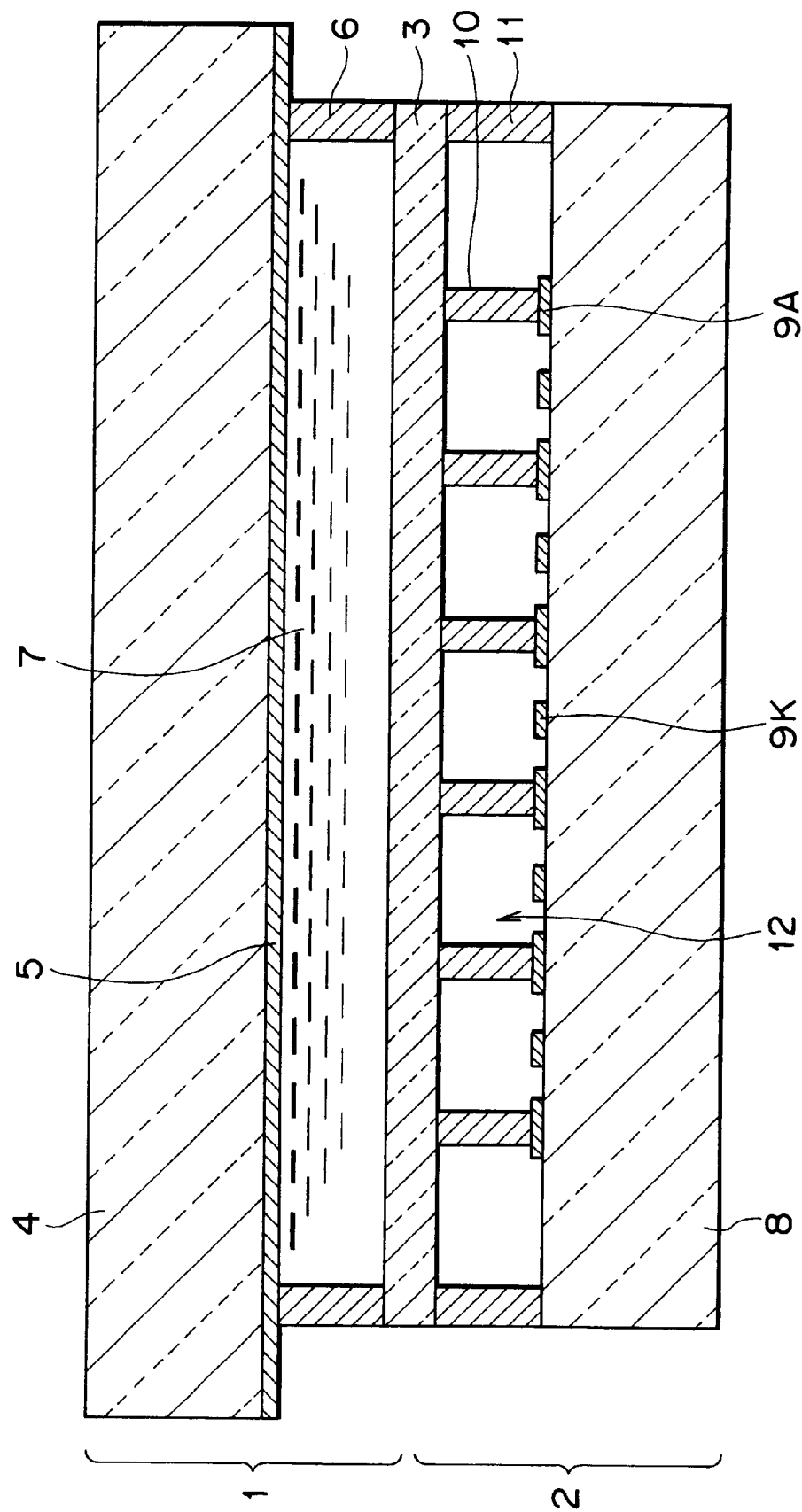
FIG. 1 is a sectional view showing a related art plasma addressing display device.
Figure 3:
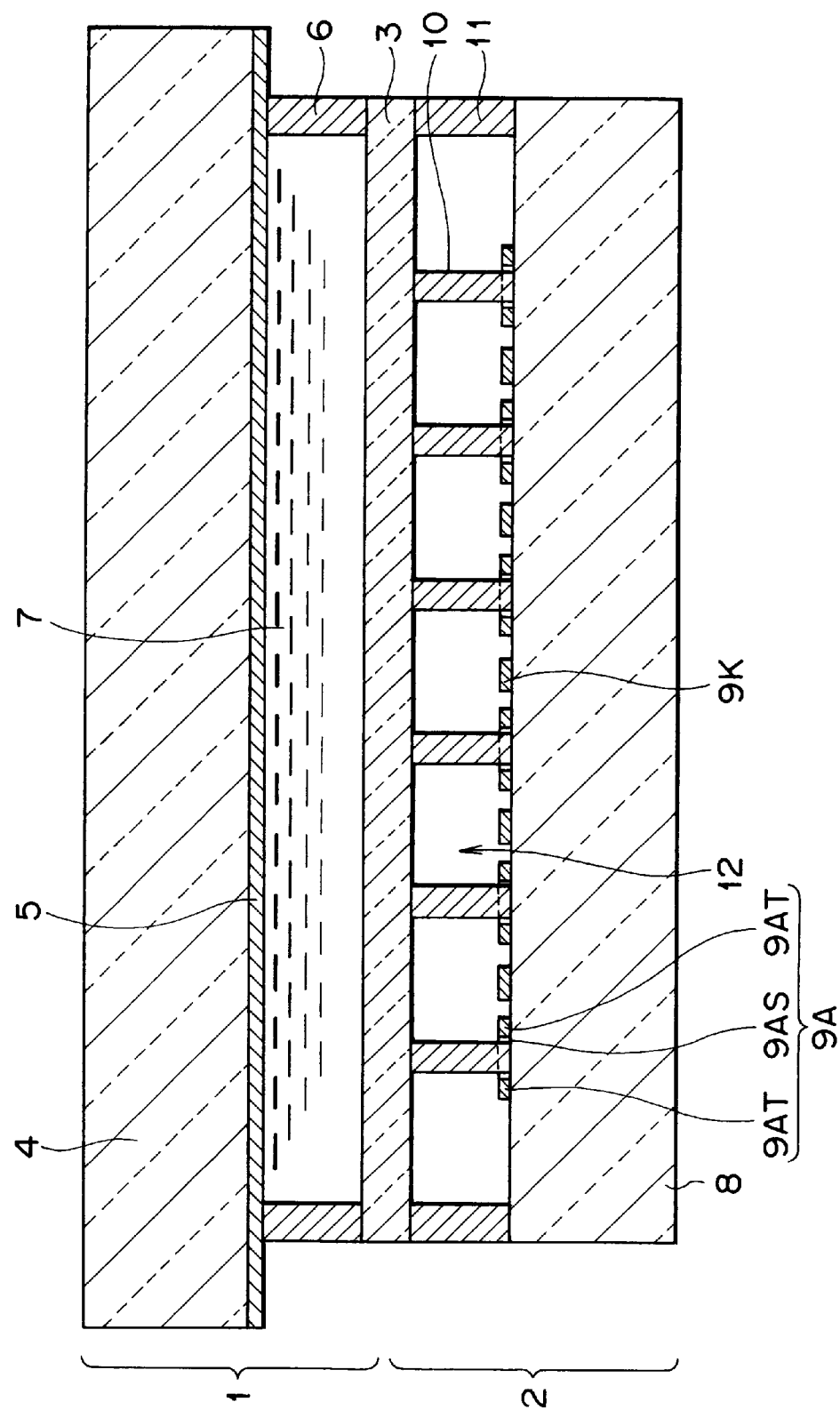
FIG. 3 is a sectional view of a plasma addressing display device of the present invention.

FIG. 3 is a typical sectional view showing a basic configuration of a plasma addressing display device of the present invention. The plasma addressing display device has a flat panel structure in which a display cell 1 and a plasma cell 2 are stacked to each other.

The plasma cell 2 includes discharge channels 12 sequentially arranged along the scanning direction (from left to right in FIG. 3).

The display cell 1 is joined to the plasma cell 2 via an intermediate substrate 3, and includes signal electrodes 5 sequentially arranged in the direction perpendicular to the scanning direction (in the direction perpendicular to the paper plane in FIG. 3), and a layer of an electro-optic material such as a liquid crystal 7 in contact with the signal electrodes 5. To be more specific, the stripe-shaped signal electrodes 5 are formed on the inner surface of an upper substrate 4. The upper substrate 4, formed of a glass plate, is joined to the intermediate substrate 3 formed of a thin glass plate via a sealing material 6.

The plasma cell 2 has a lower substrate 8, formed of a glass plate, joined to the intermediate substrate 3 by means of glass frit 11 with a specific gap kept therebetween.

Discharge electrodes 9A and 9k extending along the discharge channels 12 and barrier ribs 10 for partitioning adjacent ones of the discharge channels 12 from each other are provided on the lower substrate 8.

The discharge electrode 9A functions as an anode, and the discharge electrode 9K functions as a cathode.

As a feature of the present invention, the anode side discharge electrode 9A is composed of a pair of parallel longitudinal electrode portions 9AT disposed on both sides of the barrier rib 10, and a plurality of crossarm electrode portions 9AS disposed on the underside of the barrier rib 10 in such a manner as to connect the pair of longitudinal electrode portions 9AT to each other.

The discharge electrodes 9A and 9K are preferably formed of a metal thin film. For example, aluminum is deposited by sputtering or vacuum vapor-deposition, and the aluminum film thus formed is selectively etched into the shapes of the discharge electrodes 9K and 9A. The single aluminum film as the electrode material may be replaced with a multi-layer metal thin film in which a chromium film, a copper film and a chromium film are stacked.

The barrier ribs 10 are formed by overlappingly coating the crossarm electrode portions 9AS and the lower substrate 8 with dielectric paste such as glass paste by screen printing and baking it.

FIGS. 4A to 4D are plan views each showing a positional relationship between the anode side discharge electrode 9A and the barrier rib 10.

As shown in FIG. 4A, the discharge electrode 9A is composed of the pair of parallel longitudinal electrode portions 9AT disposed on both the sides of the barrier rib 10, and the plurality of crossarm electrode portions 9AS disposed on the underside of the barrier rib 10 in such a manner as to connect the pair of the longitudinal electrode portions 9AT to each other.

In this embodiment, the plurality of crossarm electrode portions 9AS are arranged in such a manner as to be spaced at specific intervals and to cross the longitudinal electrode portions 9AT at right angles. As a result, the discharge electrode 9A has a ladder shape in a plan view as a whole.

The width of the longitudinal electrode portion 9AT is 80 $\mu$m, and the width of the barrier rib 10 is 160 $\mu$m. A slight gap is formed between the barrier rib 10 and each longitudinal electrode portion 9AT.

The above dimensional relationship is for illustrative purposes only, and therefore, the present invention is not limited thereto. For example, the end portion of the longitudinal electrode portion 9AT may partially enter under the bottom of the barrier rib 10.

The width of the crossarm electrode portion 9AS is 100 $\mu$m and the gap between the adjacent ones of the crossarm electrode portions 9AS is 900 $\mu$m. These dimensions are also for illustrative purposes only, and therefore, the present invention is not limited thereto.

In general, the adhesive strength between the barrier rib 10 made from glass paste and the discharge electrode 9A formed of a metal thin film is small. On the contrary, the adhesive strength between the barrier rib 10 and the lower substrate 8 formed of a glass plate is large. According to the present invention, since most of the bottom of the barrier rib 10 is in direct-contact with the glass substrate, it is possible to form the strong barrier rib 10, and hence to eliminate the related art problem associated with peeling of the barrier rib.

The discharge electrode 9A is configured such that the crossarm electrode portions 9AS disposed on the underside of the barrier rib 10 substantially cyclically connect both the longitudinal electrode portions 9AT to each other. Accordingly, even if there occurs a disconnection Z at part of the longitudinal electrode portion 9AT, the power feeding path can be ensured by bypassing the disconnection Z via the crossarm electrode portions 9AS, whereby there occurs no line defect as the whole of the discharge electrode 9A.

The increased electric resistance accompanied by thinning of the longitudinal electrode portions 9AT can be suppressed by the presence of the crossarm electrode portions 9AS.

Although part of the bottom of the barrier rib 10 is placed on the crossarm electrode portions 9AS of the discharge electrode 9A, the strength of the barrier rib 10 is not reduced so much because the direct-contact portion of the bottom of the barrier rib 10 with the glass substrate is very larger than the contact portion thereof with the crossarm electrode portions 9AS of the discharge electrode 9A. The barrier rib 10 is formed by coating the crossarm electrode portions 9AS and the glass substrate with dielectric paste by screen printing and baking it, to be thus strongly sintered on the glass substrate. As a result, it is possible to ensure the adhesive strength of the barrier ribs 10 against the glass substrate as a whole.

FIG. 4B shows a reference structural example of the discharge electrode and the barrier rib. In this example, a pair of the longitudinal electrode portions 9AT are provided on both the sides of the barrier rib 10; however, the crossarm electrode portions 9AS are not provided. Accordingly, the bottom of the barrier rib 10 disposed between both the longitudinal electrode portions 9AT is entirely in direct-contact with the glass substrate, whereby the adhesive strength of the barrier rib 10 is made larger. However, if there occurs a disconnection Z at part of the longitudinal electrode portion 9AT, the disconnection may lead to a critical defect because a bypass via the crossarm electrode portion is not formed. Further, the electric resistance is increased due to thinning of the longitudinal electrode portions 9AT, which exerts adverse effect on the display operation.

FIG. 4C shows another embodiment of the plasma addressing display device of the present invention, particularly, another embodiment of the discharge electrode. In this embodiment, the crossarm electrode portions 9AS obliquely cross the longitudinal electrode portions 9AT. FIG. 4D shows a further embodiment of the discharge electrode. In this embodiment, the crossarm electrode portions 9AS obliquely cross the longitudinal electrode portions 9AT, and further adjacent ones of the crossarm electrode portions 9AS cross each other on the underside of the barrier rib 10.

As described above, according to the present invention, each of the anode side discharge electrodes in the plasma cell constituting part of the plasma addressing display device is composed of the pair of longitudinal electrode portions disposed on both the sides of the barrier rib and the plurality of crossarm electrode portions disposed on the underside of the barrier rib in such a manner as to connect the pair of the longitudinal electrode portions to each other. In this way, the discharge electrode has a ladder structure in which the pair of the longitudinal electrode portions are combined with the plurality of the crossarm electrode portions; and the barrier rib is disposed between both the longitudinal electrode portions.

Since most of the bottom of the barrier rib is in direct-contact with the surface of the glass substrate, the adhesive strength of the barrier rib against the glass substrate is made large. Since the rate of the contact of the barrier rib with the glass substrate to the contact of the barrier rib with the metal thin film forming the discharge electrode becomes large, it is possible to increase the adhesive strength of the barrier rib and reduce the peeling of the barrier rib. Further, since the discharge electrode is formed into the ladder shape as a whole, the increased electric resistance can be suppressed and also a disconnection failure due to thinning of the longitudinal electrode portions can be reduced.

What is claimed is:

1. In a plasma addressing display device comprising:
   a plasma cell including discharge channels sequentially arranged along the scanning direction; and
   a display cell joined to said plasma cell, said display cell including signal electrodes sequentially arranged in the direction perpendicular to the scanning direction and an electro-optic material layer being in contact with said signal electrodes;
   wherein said plasma cell has a substrate jointed to said display cell side with a specific gap kept therebetween; discharge electrodes formed on said substrate in such a manner as to extend along said discharge channels; and barrier ribs formed on said substrate in such a manner as to partition adjacent ones of said discharge channels from each other;
   the improvement wherein
      each of said discharge electrodes is composed of a pair of parallel longitudinal electrode portions disposed on both sides of one of said barrier ribs, and a plurality of crossarm electrode portions disposed on the underside of said barrier rib in such a manner as to connect said pair of longitudinal electrode portions to each other.

2. A plasma addressing display device according to claim 1, wherein said discharge electrodes are formed of a metal thin film, and said barrier ribs are formed of a baked body of a dielectric paste.

3. A plasma addressing display device according to claim 1, wherein said discharge electrodes are anode electrodes.

4. A plasma addressing display device according to claim 1, wherein said plurality of crossarm electrode portions are arranged in such a manner as to be spaced at specific intervals and to cross said pair of longitudinal electrode portions at right angles, so that said discharge electrode is formed into a ladder shape in a plan view as a whole.

5. A plasma addressing display device according to claim 1, wherein said plurality of crossarm electrode portions obliquely cross said pair of longitudinal electrode portions.

* * * * *